United States Patent

Kurakake et al.

[11] Patent Number: 5,025,200
[45] Date of Patent: Jun. 18, 1991

[54] SYNCHRONOUS CONTROL SYSTEM

[75] Inventors: Mitsuo Kurakake, Hino; Jiro Kinoshita, Yamanashi, both of Japan

[73] Assignee: Fanuc Ltd, Minamitsuru, Japan

[21] Appl. No.: 427,124

[22] PCT Filed: Feb. 23, 1989

[86] PCT No.: PCT/JP89/00193
 § 371 Date: Oct. 10, 1989
 § 102(e) Date: Oct. 10, 1989

[87] PCT Pub. No.: WO89/08289
 PCT Pub. Date: Sep. 8, 1989

[30] Foreign Application Priority Data

Feb. 26, 1988 [JP] Japan .................................. 63-043961

[51] Int. Cl.[5] .................................................. G05B 19/18
[52] U.S. Cl. .................................. 318/569; 318/571; 318/574; 318/625
[58] Field of Search ................. 318/569, 571, 574, 625

[56] References Cited

U.S. PATENT DOCUMENTS

| 4,558,419 | 12/1985 | Kanematsu et al. | 364/474 |
| 4,629,956 | 12/1986 | Nozawa et al. | 318/625 |
| 4,766,546 | 8/1988 | Fujimata | 318/574 X |
| 4,879,660 | 11/1989 | Asakura et al. | 318/571 |
| 4,908,555 | 3/1990 | Ikeda et al. | 318/567 |

Primary Examiner—William M. Shoop, Jr.
Assistant Examiner—Saul M. Bergmann
Attorney, Agent, or Firm—Staas & Halsey

[57] ABSTRACT

Disclosed is a synchronous control system for effecting a synchronous and superimposed operation among different channels of a multi-channel-control machine tool. A follow-up error amount ($\epsilon 3$) of a servomotor responsive to a superimposing instruction is simulated, a difference is determined by subtracting the follow-up error amount ($\epsilon 3$) to the superimposing instruction from a follow-up error amount ($\epsilon 2$) of a servomotor for a superimposed operation axis (Z2) and the difference is compared with a follow-up error amount ($\epsilon 1$) of a servomotor for a synchronous operation axis (Z1) to produce an alarm when the comparison indicates the operation of the servomotors is synchronized and superimposed.

With this arrangement, a synchronous error can be checked when a superimposed operation of the servomotors is effected.

12 Claims, 2 Drawing Sheets

Z2C (MOVING INSTRUCTION TO Z2-AXIS)

SYNCHRONOUS CONTROL SYSTEM

BACKGROUND OF THE INVENTION

1. Field of the Invention

The present invention relates to a synchronous control system for effecting a synchronous and superimposed operation among different channels of a multi-channel-control machine tool, and more specifically, to a synchronous control system wherein the reliability of the system is improved when the synchronous and superimposed operation is effected.

2. Description of the Related Art

Numerically controlled machine tools, and in particular numerically controlled lathes and the like, are provided with a multiplicity of tool posts to enable a workpiece to be cut by a plurality of tools, to thereby increase the cutting speed. Accordingly, some of the tool posts must effect not only a movement relative the movement of a spindle but also a movement including the amount of movement of the spindle. This operation is referred to as a superimposed operation.

FIG. 3 is a schematic block diagram of a numerically controlled lathe as a multi-channel-control machine tool provided with a plurality of tool posts, wherein 61 designates a spindle controlled in a Z direction, herein referred to as a Z1-axis. In the numerically controlled lathe, the Z-axis is operated synchronously with the rotation of the spindle 61.

In FIG. 3, 62 designates a first tool post controlled only in an X direction, herein referred to as an X1-axis. Note, the spindle 61 and the first tool post 62 constitute a usual X - Z coordinate.

Designated at 63 is a second tool post controlled in the X- and Z-axis directions, herein referred to as an X2-axis and a Z2-axis. The second tool post 63 is independently operated on the X - Z coordinate when the spindle 61 does not move along the Z1-axis. However, when the spindle 61 is moved in the Z1-axis direction, the operation of the Z2-axis is superimposed with that of the Z1-axis of the spindle 61, since the movement of the Z2-axis must include the amount of movement of the Z1- axis. More specifically, the Z2-axis must be moved by an amount determined by adding the amount of movement of the Z1-axis to the original amount of movement of the Z2-axis.

Designated at 64 is a third tool post controlled only in the Z-axis direction, herein referred to as a Z3-axis. The operation of the Z3-axis is also superimposed with that of the Z1-axis.

When the operation of the multi-channel-control machine tool is superimposed as described above, each coordinate axis is controlled by a respective servomotor, but since a conventional servomotor control system can not detect a relative follow-up error therebetween, an alarm condition cannot be detected even if the control of the servomotors is erroneously effected.

More specifically, although servomotor control circuits for controlling the Z1-axis and the Z2-axis in FIG. 3 independently monitor an excessive follow-up error wherein a follow-up error amount exceeds a predetermined amount, they can not monitor a relative follow-up error amount or the like.

SUMMARY OF THE INVENTION

Taking the above into consideration, an object of the present invention is to provide a synchronous control system wherein the reliability of the system is improved when a synchronous and superimposed operation is effected.

To solve the above problem, in accordance with the present invention, there is provided a synchronous control system for effecting a synchronous and superimposed operation among different channels of a multi-channel-control machine tool, wherein a third follow-up error amount of a servomotor responsive to a superimposing instruction is simulated, a difference is determined by subtracting the third follow-up error amount to the superimposing instruction from a second follow-up error amount of a servomotor for a superimposed operation axis. The difference is then compared with a first follow-up error of a servomotor for a synchronous axis to produce an alarm condition when the comparison indicates the operation of the servomotors is synchronized and superimposed.

An amount of movement of the synchronous operation axis is superimposed on a servomotor control circuit of the superimposed operation axis. Thus when a follow-up error amount of the independent amount of movement of the superimposed operation axis is simulated and the value obtained as a result of the simulation is subtracted from a follow-up error amount of the servomotor control circuit of the superimposed operation axis, a follow-up error amount of the synchronous operation axis is determined.

If the superimposed operation axis and the synchronous operation axis are operating normally, the follow-up error amount determined as above must coincide with the follow-up error amount of the servomotor control circuit of the synchronous operation axis. Thus, a comparison of both amounts provides a confirmation of a normal operation of the synchronous operation axis and the superimposed operation axis.

DESCRIPTION OF THE PREFERRED EMBODIMENT

An embodiment of the present invention will be described below with reference to drawings.

Figure 1:
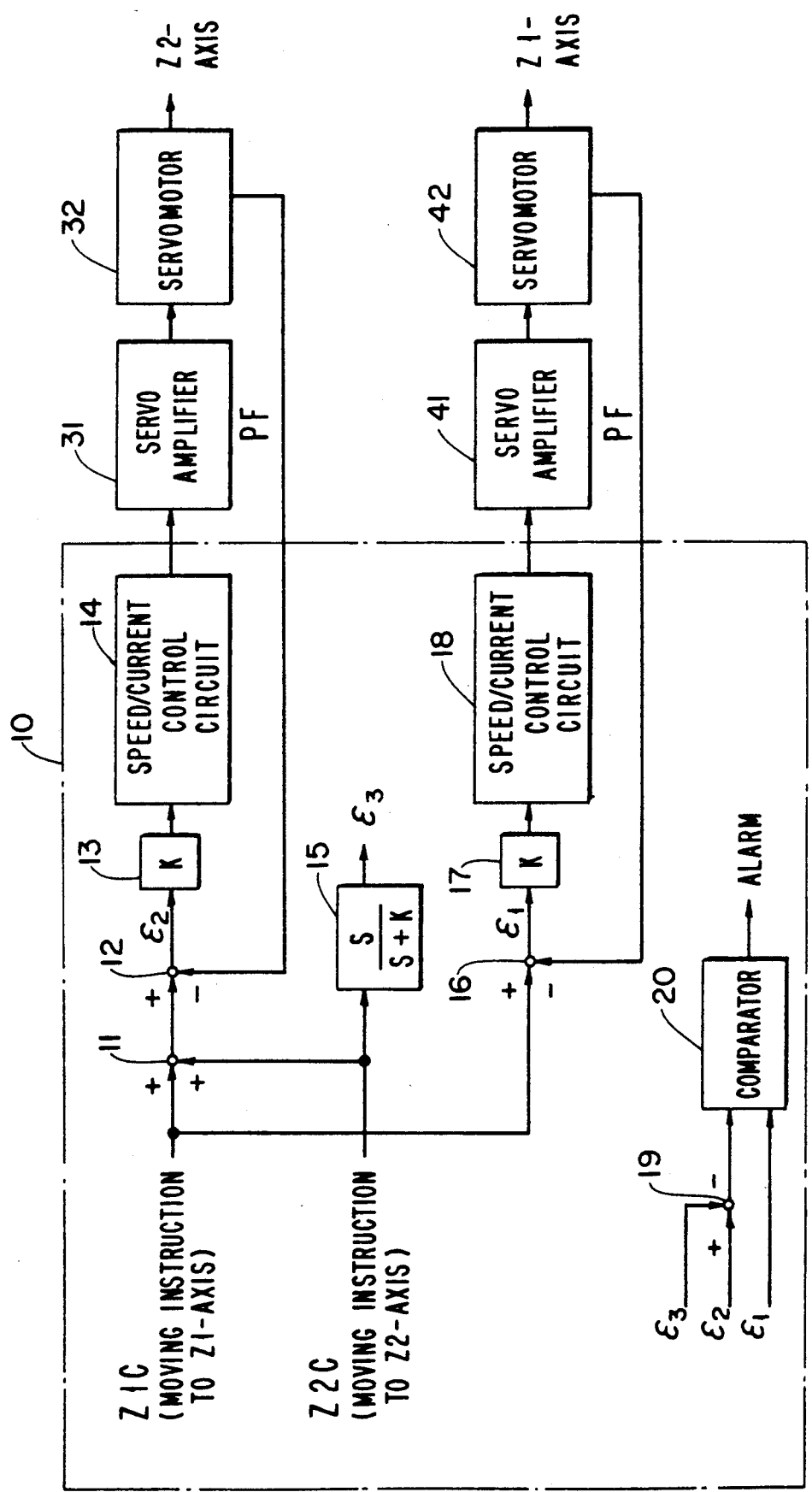
FIG. 1 is a block diagram of control effected by a synchronous control system according to the present invention.

FIG. 1 is a block diagram of control effected by a synchronous control system according to the present invention.

In this description, only the control of the Z1-axis (synchronous operation axis) and the Z2-axis (superimposed operation axis) will be described, in order to facilitate understanding. However, the approach is the same for other synchronous and superimposed operation axes.

In FIG. 1, 10 designates a servomotor control circuit for effecting a speed control and current control of the Z1- and Z2-axes. The servomotor control circuit 10 comprises (although not shown) a microprocessor, a digital signal processor (DSP) or the like, and accordingly, the following transfer function (discussed below) is processed by software in the microprocessor or the DSP.

In FIG. 1, 11 designates an adder for adding a movement instruction Z1C to the Z1-axis and a movement instruction Z2C to the Z2-axis, 12 designates an adder for subtracting a positional feedback amount from the movement instruction output from adder 11 and outputting the result of the subtraction, where the output from the adder 12 is a follow-up error amount $\epsilon 2$ of the Z2-axis, 13 designates a gain, and 14 designates a speed and current control circuit for effecting the speed control and the current control.

Designated at 15 is a simulation circuit for simulating a follow-up error amount of a movement, instruction given to the Z2-axis (superimposed operation axis), to independently move the axis and to output a follow-up error amount $\epsilon 3$ when the Z2-axis is independently moved.

Designated at 16 is an adder for subtracting a positional feedback amount of the Z1-axis from the movement instruction Z1C to the Z1-axis and outputting the result of the subtraction. The output $\epsilon 1$ from the adder 16 being, a follow-up error amount of the Z1-axis. Designated at 17 is a gain, and designated at 18 is a speed and current control circuit for effecting a speed control and a current control.

Designated at 19 is an adder for subtracting the follow-up error amount $\epsilon 3$ of the Z2-axis produced when the Z2-axis is independently moved from a follow-up error amount $\epsilon 2$ of the Z2-axis, and outputting the result of the subtraction. Designated at 20 is a comparator for comparing the output from the adder 19 with the output from the adder 16 for the Z1-axis (i.e. $\epsilon 1$). When the Z1-axis and the Z2-axis are normally operated, the inputs to the comparator 20 should coincide, and therefore, when a difference between both inputs exceeds a predetermined value, an alarm condition is produced. Since the value $\epsilon 3$ is determined as a result of the simulation, the inputs to the comparator do not strictly coincide and thus a difference within the predetermined value is ignored as an allowance.

Figure 3:
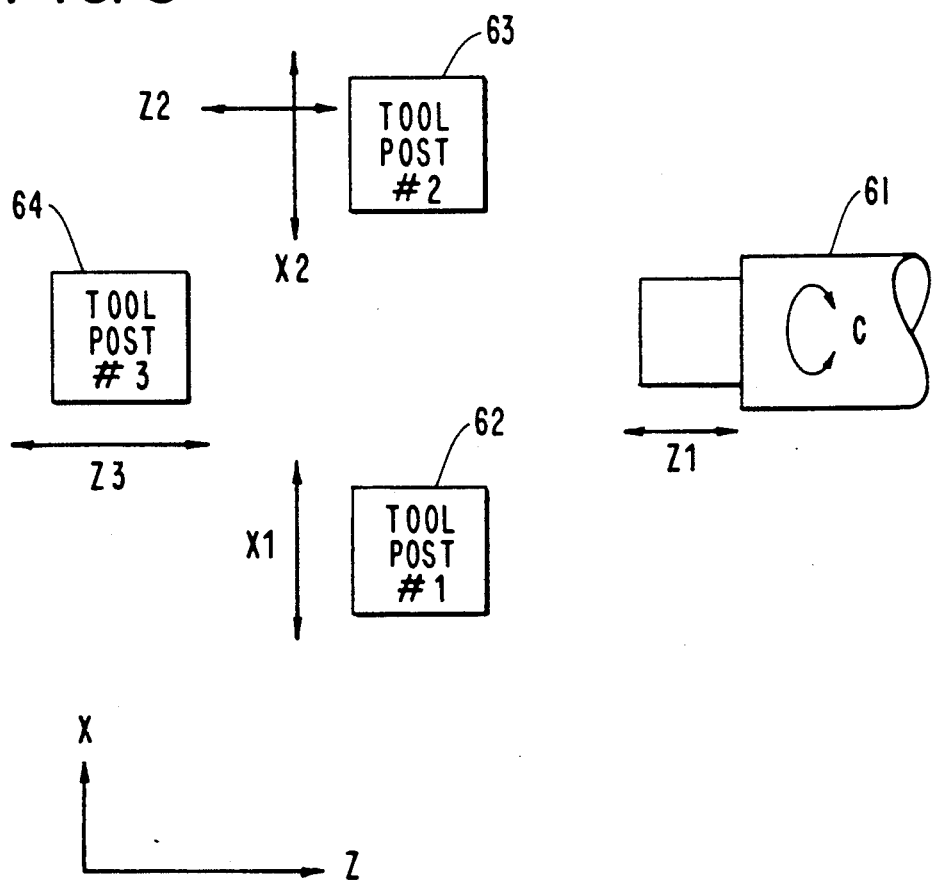
FIG. 3 is a schematic diagram of a numerically controlled lathe as a multi-channel-control machine tool provided with a plurality of tool posts.

Designated at 31 is a servo amplifier of the Z2-axis and designated at 32 is a servomotor thereof for controlling the movement of the mechanical unit of the Z2-axis, i.e., the tool post 63 in FIG. 3, in the Z-axis direction.

Designated at 41 is a servo amplifier of the Z1-axis and designated at 42 is a servomotor thereof for controlling the movement of the mechanical unit of the Z1-axis, i.e., the spindle 61 in FIG. 3, in the Z1-axis direction.

Figure 2:
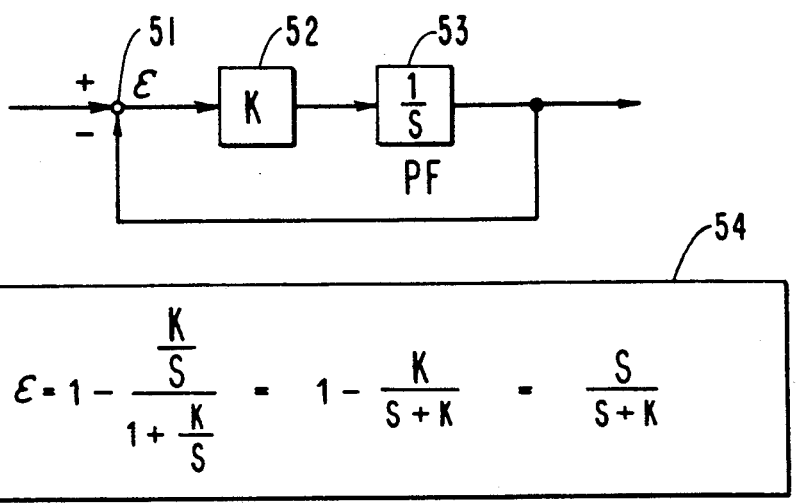
FIG. 2 is a detailed diagram of a simulation circuit.

FIG. 2 shows the details of the simulation circuit 15, wherein 51 designates an adder, 52 designates a gain, and 53 designates an integrator. The output from the integrator 53 is negatively fed back to the adder 51.

With the arrangement as described above, a transfer function of the simulation circuit 15 of FIG. 3 can be determined as shown in equation 54 illustrated in FIG. 2.

As described above, according to the present invention, a follow-up error amount of an independent movement of the superimposed operation axis is simulated and the follow-up error amount determined as a result of the simulation is subtracted from a follow-up error amount of the servomotor control circuit of the superimposed operation axis to determine a follow-up error amount of the synchronous operation axis. The follow-up error amount thus determined is compared with an actual follow-up error amount of the synchronous operation axis. As a result, a synchronous error produced in a superimposed operation, which error would not otherwise be detected, can be detected. Thus, the reliability of a multi-channel-control machine tool is improved.

What is claimed is:

1. A synchronous control system for effecting a synchronous and superimposed operation among different channels of a multi-channel-control machine tool having servomotors, characterized in that a third follow-up error amount of a servomotor responsive to a superimposing instruction is simulated, a difference is determined by subtracting the third follow-up error amount to the superimposing instruction from a second follow-up error amount of a servomotor for a superimposed operation axis and said difference is compared with a first follow-up error amount of a servomotor for a synchronous operation axis to produce a comparison result, and determining an alarm condition when the operation of the servomotors is synchronized and superimposed based on the comparison result.

2. A synchronous control system according to claim 1, wherein said synchronous control system includes servomotor control circuits having processors for calculating said difference and said comparison.

3. A synchronous control system according to claim 2, wherein said servomotor control circuits are digitally controlled.

4. A method for effecting a synchronous and superimposed operation among different channels of a multi-channel-control machine tool, said method comprising the steps of:
  (a) determining a first follow-up error amount of a first servomotor for a synchronous operation axis;
  (b) determining a second follow-up error amount of a second servomotor for a superimposed operation axis;
  (c) simulating a third follow-up error amount corresponding to independent movement of a simulated servomotor responsive to a superimposed instruction;
  (d) calculating a difference between the second follow-up error amount and the third follow-up error amount; and
  (e) comparing the difference calculated in step (d) with the first follow-up error amount.

5. A method according to claim 4, wherein said method further comprises the step of (f) producing an alarm signal based upon said comparing in step (e).

6. A method according to claim 5, wherein step (f) produces an alarm signal if said comparing in step (e) indicates that the difference is not within a predetermined threshold of the first follow-up error amount.

7. A method according to claim 4, wherein said method further comprises step (f) determining a synchronous error resulting from the synchronous and superimposed operation based on said comparing in step (e).

8. A synchronous control system for a multi-channel machine tool having servomotors capable of performing a superimposed axis operation instruction and a synchronous axis operation instruction, said system comprising:
  first servomotor means for controlling the multichannel machine tool along a synchronous operation axis and for outputting a first feedback signal;
  first calculation means for subtracting the first feedback signal from the synchronous axis operation instruction to produce a first follow-up error amount of said first servomotor for the synchronous operation axis;

second servomotor means for controlling the multichannel machine tool along a superimposed operation axis and for outputting a second feedback signal;

addition means for adding the synchronous axis operation instruction and the superimposed axis operation instruction to produce a superimposed instruction;

second calculation means for subtracting the second feedback signal from the superimposed instruction to produce a second follow-up error amount of a second servomotor for the superimposed operation axis;

simulation means for simulating a third follow-up error amount corresponding to independent movement of a simulated servomotor responsive to the superimposed axis operation instruction for the superimposed operation axis;

third calculation means for calculating a difference between the second follow-up error amount and the third follow-up error amount; and comparison means for comparing the difference calculated by said third calculation means with the first follow-up error amount.

9. A system according to claim 8, wherein said comparison means produces an alarm signal based upon the comparing by said comparison means.

10. A system according to claim 9, wherein said comparison means produces an alarm signal if the comparing indicates that the difference is not within a predetermined threshold of the first follow-up error amount.

11. A system according to claim 8, wherein the difference represents an estimated follow-up error of the synchronous operation axis.

12. A method according to claim 11, wherein said comparison means determines a synchronous error based on the comparing by said comparison means.

* * * * *

UNITED STATES PATENT AND TRADEMARK OFFICE
CERTIFICATE OF CORRECTION

PATENT NO. : 5,025,200

DATED : June 18, 1991

INVENTOR(S) : Kurakake et al.

It is certified that error appears in the above-identified patent and that said Letters Patent is hereby corrected as shown below:

ON TITLE PAGE: [75] Inventors, "Hino" should be --Tokyo--.

[57] ABSTRACT, lines 14 and 15 should be a continuous paragraph.

Col. 1, lines 57 and 58 should be a continuous paragraph.

Col. 2, line 20, "Thus" should be --Thus,--;
line 62, delete"a".

Col. 3, line 12, "movement," should be --movement--;
line 21, "being," should be --being--;

Col. 4, line 63, "multichan-" should be --multi-chan- --.

Signed and Sealed this

Tenth Day of November, 1992

Attest:

DOUGLAS B. COMER

Attesting Officer

Acting Commissioner of Patents and Trademarks